United States Patent
Kawarada

(10) Patent No.: US 7,822,332 B2
(45) Date of Patent: Oct. 26, 2010

(54) IMAGING APPARATUS AND LENS APPARATUS

(75) Inventor: Masahiro Kawarada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 12/350,656

(22) Filed: Jan. 8, 2009

(65) Prior Publication Data

US 2009/0185799 A1 Jul. 23, 2009

(30) Foreign Application Priority Data

Jan. 22, 2008 (JP) ............................. 2008-011630
Jun. 27, 2008 (JP) ............................. 2008-169330

(51) Int. Cl.
*G03B 17/00* (2006.01)
*G03B 13/00* (2006.01)

(52) U.S. Cl. ........................ 396/80; 348/345; 348/353

(58) Field of Classification Search .................. 396/80; 348/345, 353

See application file for complete search history.

(56) References Cited

U.S. PATENT DOCUMENTS

| 5,140,357 A | 8/1992 | Suda |
| 6,876,391 B1 | 4/2005 | Hashimoto |
| 7,602,436 B2 | 10/2009 | Kikuchi |
| 2003/0063211 A1* | 4/2003 | Watanabe et al. ........... 348/345 |
| 2004/0212721 A1 | 10/2004 | Watanabe |
| 2005/0275743 A1 | 12/2005 | Kikuchi |
| 2005/0285967 A1* | 12/2005 | Suda ........................... 348/345 |
| 2007/0195189 A1* | 8/2007 | Kimoto ....................... 348/345 |
| 2008/0118238 A1* | 5/2008 | Sogawa et al. .............. 396/128 |

FOREIGN PATENT DOCUMENTS

| EP | 404523 A2 | 12/1990 |
| EP | 1615058 A2 | 1/2006 |
| JP | 05-191701 A | 7/1993 |
| JP | 2821214 B2 | 11/1998 |
| JP | 2002-131621 A | 5/2002 |
| JP | 2005-351997 A | 12/2005 |
| WO | 2007/057498 A | 5/2007 |

* cited by examiner

*Primary Examiner*—Rodney E Fuller
(74) *Attorney, Agent, or Firm*—Canon U.S.A., Inc. I.P. Division

(57) ABSTRACT

An imaging apparatus to which a lens apparatus is detachably attached includes an image sensor configured to generate an image signal by photoelectrically converting an object image, a first acquisition unit configured to acquire a contrast value of the image signal acquired by the image sensor, a second acquisition unit configured to acquire lens position information at a predetermined time interval, and a focus detection unit configured to detect a focal position based on outputs of the first acquisition unit and the second acquisition unit, wherein the focus detection unit selects the lens position information that corresponds to the contrast value acquired by the first acquisition unit from a plurality of pieces of the lens position information acquired by the second acquisition unit at the predetermined time interval, and detects the focal position.

6 Claims, 7 Drawing Sheets

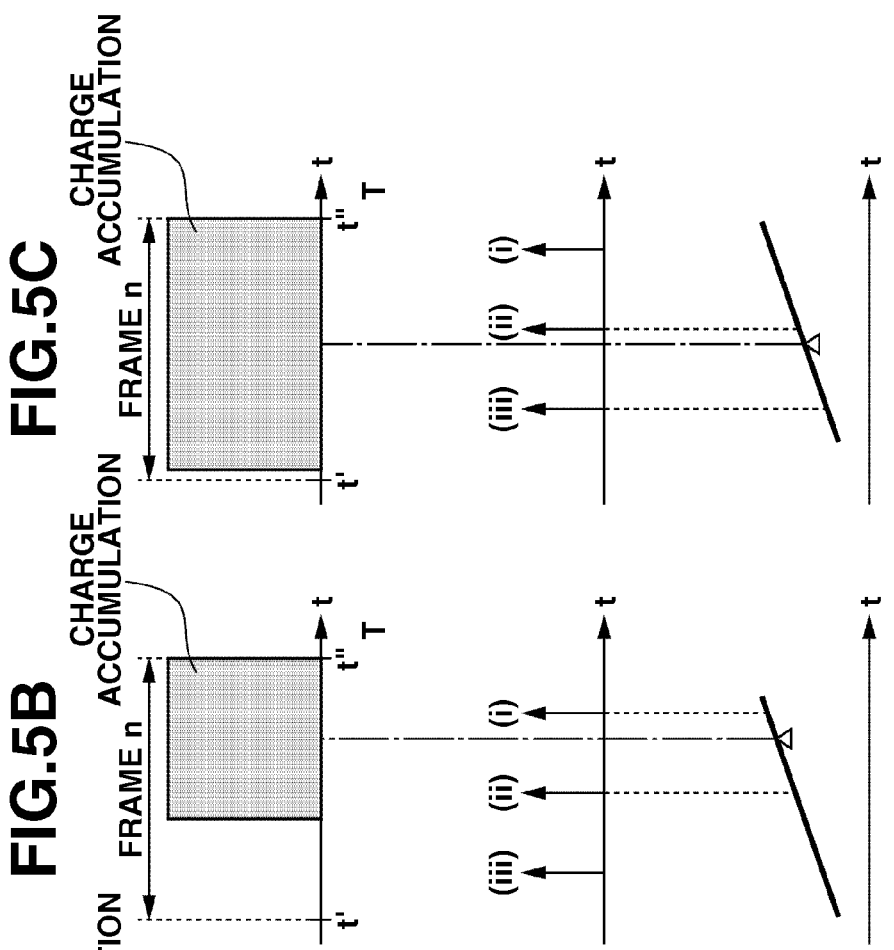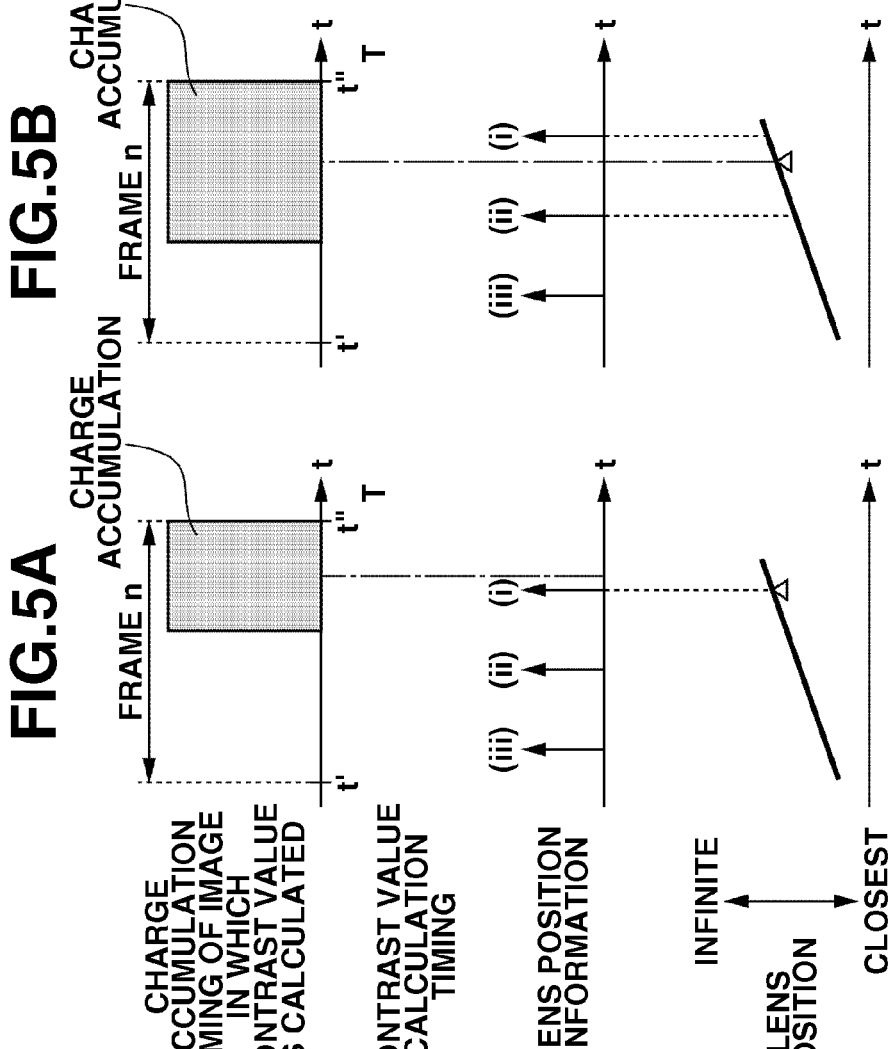

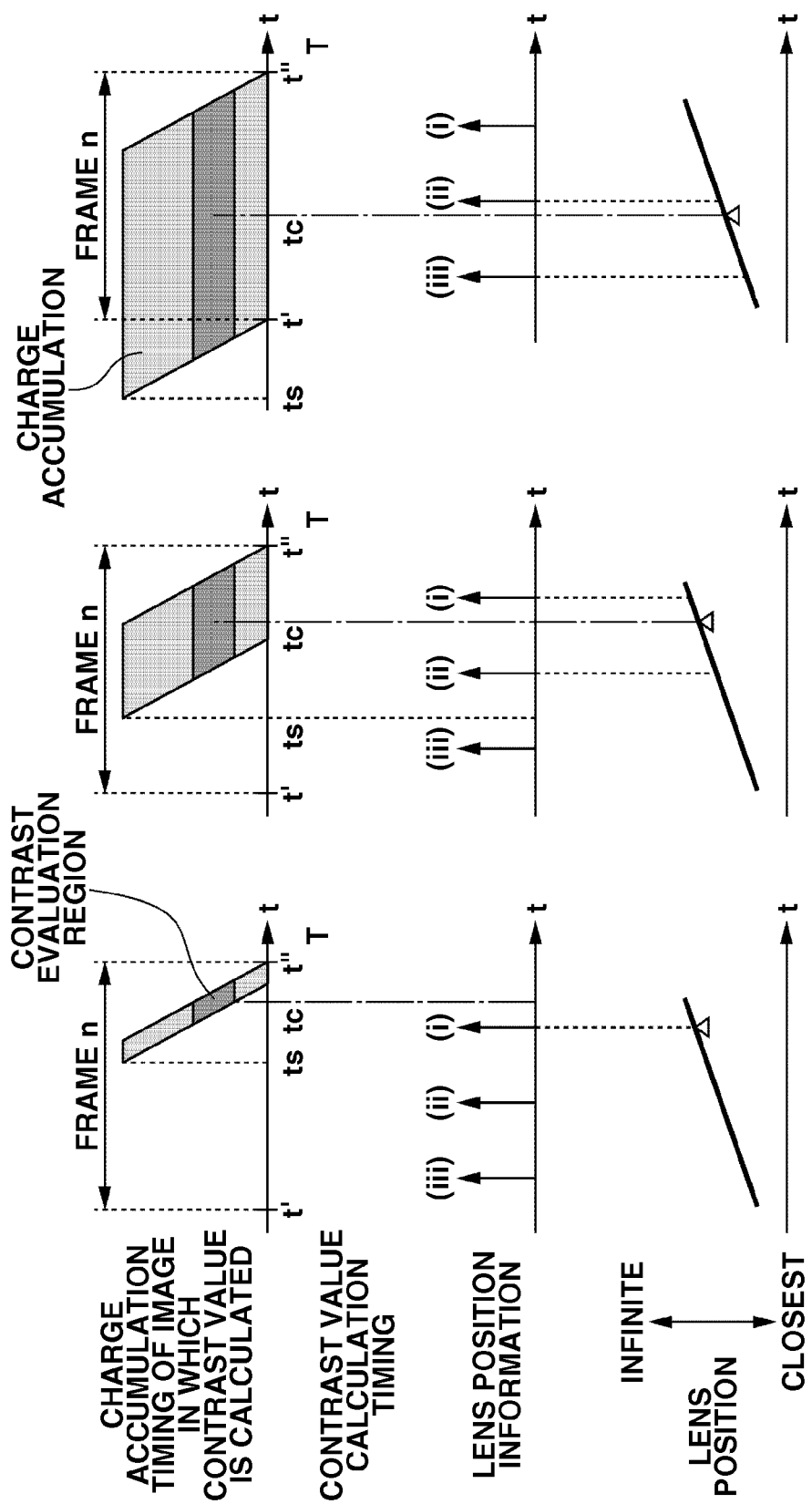

IMAGING APPARATUS AND LENS APPARATUS

BACKGROUND OF THE INVENTION

1. Field of the Invention

The present invention relates to an imaging apparatus such as a digital camera or a video camera. In particular, the present invention relates to a focus detection technique that acquires a contrast value of a captured image and detects a focal position based on the contrast value while driving a lens.

2. Description of the Related Art

A contrast method (also referred to as a hill-climbing method or a television autofocus (TV-AF) method) is applied to an AF operation. The contrast method acquires a contrast of a captured image at each step of driving a focusing lens that is included in an imaging lens, or an image sensor, in a direction of the optical axis. The contrast is acquired as an evaluation value, and a lens position that corresponds to the highest evaluation value is defined as an in-focus position. Japanese Patent No. 02821214 discusses an AF operation using the contrast method.

When the AF operation is performed using contrast information about an entire image plane, the AF operation tends to be affected by a perspective competition caused by a plurality of objects whose distances to an imaging apparatus are different. Consequently, the contrast method is generally performed by automatically or manually selecting a portion of the image plane.

In a digital single-lens reflex camera, the image sensor is shielded from light by a mirror or a shutter except during exposure. Therefore, the image sensor is not used when the camera performs the AF operation or an automatic exposure (AE) operation. Instead, other sensors appropriate for each usage are installed in the camera, and an optical path of the light entering from the imaging lens is divided to be received by an AF sensor or an AE sensor.

In recent years, there is a demand for a live view function in the digital single-lens reflex camera. The live view function displays an image formed on the image sensor, on a display element such as a back side liquid crystal display (LCD) panel, so that a user can confirm a composition or a focusing state. When the user uses the live view function, the mirror is flipped up, the shutter is opened, and the image sensor becomes exposed. In such a state, the light does not reach the AF sensor or the AE sensor, so that the sensors cannot perform the AF operation or the AE operation.

Therefore, it is necessary to perform a contrast AF function or an imaging area AE function using the image sensor in a case where the user performs the AF operation or the AE operation while using the live view function.

A single lens reflex camera acquires a contrast evaluation value while driving the lens when performing the contrast AF operation. However, both the contrast evaluation value and information about the lens position at which the contrast evaluation value is acquired are necessary to obtain an in-focus position.

Further, a single lens reflex camera that can perform an AF operation includes a focus lens driving motor in an interchangeable lens portion. The focus lens is driven while a lens driving amount is communicated from a camera portion to the interchangeable lens portion.

In the single lens reflex camera system, a pulse encoder in the interchangeable lens portion acquires lens position information. The camera portion acquires the lens position information by communicating with the interchangeable lens.

Japanese Patent Application Laid-Open No. 2002-131621 discusses a conventional technique in which accumulation timing of a phase-difference AF sensor is synchronized with the lens position information.

However, when the contrast method is applied to a single lens reflex camera in which a lens apparatus is detachably attached to an imaging apparatus, it is difficult to relate a contrast (sharpness) acquired at certain timing to a lens position of the focus lens at that timing.

SUMMARY OF THE INVENTION

The present invention is directed to an imaging apparatus which can acquire a contrast value of an image signal while driving a lens and detect a focal position based on the acquired contrast value.

According to an aspect of the present invention, an imaging apparatus to which a lens apparatus is detachably attached includes an image sensor configured to generate an image signal by photoelectrically converting an object image, a first acquisition unit configured to acquire a contrast value of the image signal obtained by the image sensor, a second acquisition unit configured to acquire lens position information at a predetermined time interval, and a focus detection unit configured to detect a focal position based on outputs of the first acquisition unit and the second acquisition unit, wherein the focus detection unit selects the lens position information that corresponds to the contrast value acquired by the first acquisition unit, from a plurality of pieces of the lens position information acquired by the second acquisition unit at the predetermined time interval, and detects the focal position.

According to another aspect of the present invention, a lens apparatus which is detachably attached to an imaging apparatus that includes an image sensor configured to generate an image signal by photoelectrically converting an object image, and a first acquisition unit configured to acquire a contrast value of the image signal obtained by the image sensor. The lens apparatus includes a second acquisition unit configured to acquire lens position information at a predetermined time interval, and a focus detection unit configured to detect a focal position based on outputs of the first acquisition unit and the second acquisition unit, wherein the focus detection unit selects the lens position information that corresponds to the contrast value acquired by the first acquisition unit, from a plurality of pieces of the lens position information acquired by the second acquisition unit at the predetermined time interval, and detects the focal position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A, 5B, and 5C illustrate a method for calculating lens position information that corresponds to a calculated contrast value (sharpness).

FIGS. 7A, 7B, and 7C illustrate a relation between a contrast evaluation value and a lens position in a rolling shutter method.

DETAILED DESCRIPTION OF THE EMBODIMENTS

Various exemplary embodiments, features, and aspects of the invention will be described in detail below with reference to the drawings.

Figure 1:
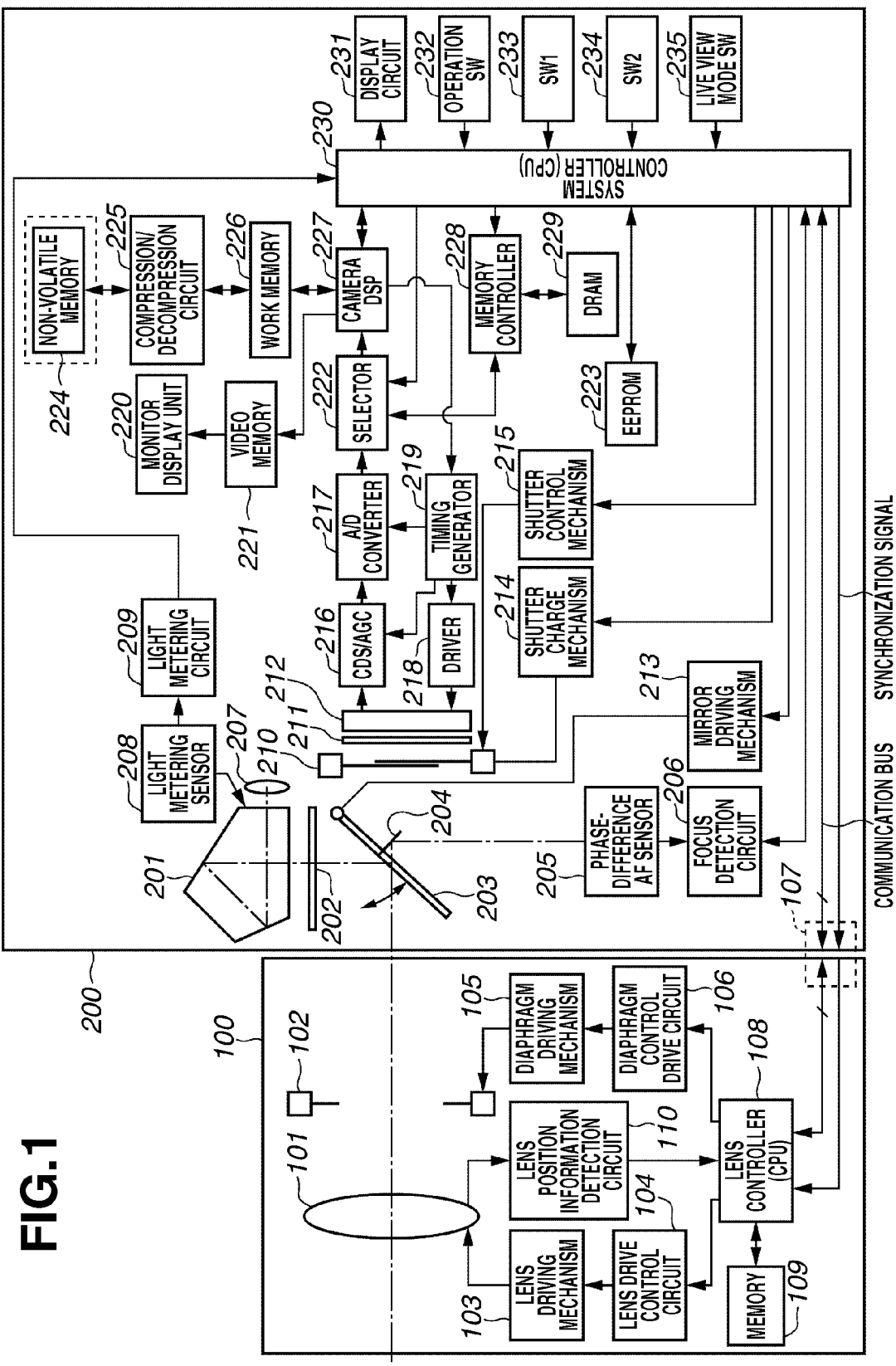
FIG. 1 is a block diagram illustrating an example of a configuration of a digital camera according to an exemplary embodiment of the present invention.

FIG. 1 is a block diagram illustrating an example of a configuration of a digital camera using an auto focusing device according to an exemplary embodiment of the present invention.

Referring to FIG. 1, a photographic lens 100 is detachably attached to a digital camera 200 via a lens attaching mechanism in a mounting unit (not illustrated).

The mounting unit includes an electrical contact unit 107. The electrical contact unit 107 includes a terminal used by a communication bus line such as a communication clock line, a data transmission line, and a data receiving line.

The digital camera 200 and the photographic lens 100 can communicate with each other via the communication bus line. More specifically, the digital camera 200 communicates with the photographic lens 100 via the electrical contact unit 107 and controls driving of a focus lens 101 and a diaphragm 102 that adjusts a light amount in the photographic lens 100. In FIG. 1, only the focus lens 101 is illustrated as a lens inside the photographic lens 100. However, the photographic lens 100 includes a variable power lens and a stationary lens that form a lens unit.

Further, the electrical contact unit 107 includes a synchronization signal line which transmits accumulation timing of an image from the camera to the lens.

A light flux from an object (not illustrated) is guided to a quick return mirror 203 in the digital camera 200 via a lens unit including the focus lens 101 and the diaphragm 102 in the photographic lens 100. The quick return mirror 203 is positioned diagonally with respect to an optical axis in a photographic optical path. The quick return mirror 203 can move to a first position (illustrated in FIG. 1) to guide the light flux from the object to a finder optical system in the upper side of the quick return mirror 203. Further, the quick return mirror 203 can move to a second position to retract to the outside of the photographic optical path.

The center of the quick return mirror 203 is a half mirror. When the quick mirror 203 is turned down in the first position, a portion of the light flux from the object is transmitted through the half mirror portion of the quick mirror 203. The transmitted light flux is then reflected by a sub-mirror 204 disposed at a back side of the quick return mirror 203. The reflected light flux is guided to a phase-difference AF sensor 205 included in an auto focus adjustment unit together with a focus detection circuit 206. The focus detection circuit 206 detects a focal status (performs a focus detection) of the photographic lens 100 using the phase-difference AF sensor 205.

On the other hand, the light flux reflected by the quick return mirror 203 reaches an eye of a photographer via a finder optical system including a finder screen 202, a pentaprism 201, and an eyepiece lens 207 in a focal plane.

Further, when the quick return mirror 203 is turned up in the second position, the light flux from the photographic lens 100 reaches an image sensor 212 via a focal plane shutter 210, i.e., a mechanical shutter, and an optical filter 211. The optical filter 211 has a function to cut the infrared light and guide only the visible light to the image sensor 212, and a function as an optical low pass filter.

The focal plane shutter 210 including a first curtain and a second curtain performs control to transmit and block the light flux entering from the photographic lens 100.

When the quick return mirror 203 is turned up in the second position, the sub mirror 204 is folded with respect to the quick return mirror 203 and retracts from the photographic optical path.

Further, the quick return mirror 203 is also turned up in the second position in a live view state in addition to the time to capture a still image.

The digital camera 200 in the present exemplary embodiment includes a system controller 230 that controls the entire digital camera. The system controller 230 includes a central processing unit (CPU) and a micro processing unit (MPU) and controls an operation of each circuit to be described below.

The system controller 230 communicates with a lens controller 108 in the photographic lens 100 via the communication bus line and the electrical contact unit 107.

The lens controller 108 includes a CPU and a MPU and controls an operation of each circuit in the photographic lens 100, similar to the system controller 230.

The system controller 230 transmits to the lens controller 108 instructions to drive and stop driving the focus lens 101, and driving amounts of the focus lens 101 and the diaphragm 102. The system controller 230 also transmits to the lens controller 108 a request to transmit various data of the lens. The lens controller 108 transmits to the system controller 230, status information about whether the focus lens 101 and the diaphragm 102 are being driven, and various parameters of the lens such as a full-aperture F value and a focal length.

When the system controller 230 performs focus control, the system controller 230 communicates with the lens controller 108 and gives an instruction on a lens driving direction and a lens driving amount.

Upon receiving a lens driving instruction from the system controller 230, the lens controller 108 controls a lens driving mechanism 103 which performs focus adjustment by driving the focus lens 101 in the direction of the optical axis via a lens drive control circuit 104. The lens driving mechanism 103 includes a stepping motor and a DC motor as a drive source.

Further, when the lens driving instruction from the system controller 230 is received, the lens controller 108 controls a diaphragm driving mechanism 105 to drive the diaphragm 102 up to the instructed value via a diaphragm control driving circuit 106.

The system controller 230 is also connected to a mirror driving mechanism 213, a shutter charge mechanism 214, a shutter control circuit 215 and a light metering circuit 209. The light metering circuit 209 is also connected to a light metering sensor 208. The shutter control circuit 215 controls driving of the first curtain and the second curtain of the focal plane shutter 210 according to a signal received from the system controller 230.

Further, the system controller 230 transmits the lens driving instruction to the lens controller 108 and controls the lens driving mechanism 103 via the lens driving control circuit 104. As a result of the above-described processes, the system controller 230 forms an image of the object on the image sensor 212.

A camera digital signal processor (DSP) 227 in the digital camera 200 includes a circuit block for calculating a contrast value in order to perform a contrast AF operation. The contrast value calculation circuit block will be described in detail below.

The camera DSP 227 is connected to a timing generator 219, an analog/digital (A/D) converter 217 via a selector 222, a video memory 221, and a work memory 226.

The image sensor 212 is driven by an output from a driver circuit 218 that horizontally and vertically drives each pixel provided with a photoelectric conversion unit based on a signal from the timing generator 219 that determines drive timing of the entire digital camera. As a result, the image sensor 212 generates and outputs an image signal by photoelectrically converting image information.

A correlated double sampling/automatic gain control (CDS/AGC) circuit 216 amplifies the image signal generated by the image sensor 212, and the A/D converter 217 converts the amplified signal to a digital signal. The digital signal output from the A/D converter 217 is input to a memory controller 228 via the selector 222 that selects a signal based on a signal received from the system controller 230. All of the signals input to the memory controller 228 are transferred to a dynamic random access memory (DRAM) 229 which is a frame memory.

In a video camera and a compact digital camera, the above-described image signal which is converted to the digital signal is regularly transmitted to a video memory 221 (for every frame) before capturing an image. As a result, a monitor display unit 220 can perform a finder display (i.e., a live view display). On the other hand, in a digital camera such as a single lens reflex camera, light is generally blocked from the image sensor 212 by the quick return mirror 203 and the focal plane shutter 210 before capturing an image. Consequently, the digital camera cannot perform the live view display.

However, the digital camera can perform the live view operation by turning the quick return mirror 203 up to retract from the photographic optical path and opening the plane shutter 210. Further, when the digital camera performs the live view operation, a contrast evaluation value that corresponds to sharpness of an image can be acquired by the camera DSP 227 or the system controller 230 processing the image signal from the image sensor 212. The digital camera can thus perform the contrast AF operation using the acquired evaluation value.

When the digital camera 200 captures an image, the digital camera 200 reads out each pixel data for one frame from the DRAM 229 according to a control signal from the system controller 230. The camera DSP 227 then performs image processing, and the processed pixel data is temporarily stored in the work memory 226. The data in the work memory 226 is compressed by a compression/decompression circuit 225 based on a predetermined compression format. A compression result is stored in an external non-volatile memory (external memory) 224 such as a flash memory, a hard disk, or a magnetic disk.

An operation display circuit 231 which is connected to the system controller 230 displays an operation status of the digital camera set or selected by a user using switches, on a display element such as an LCD, a light-emitting diode (LED), and an organic electroluminescence (EL).

A release switch SW1 233 is a switch for starting a capturing preparation operation in a light metering and focus detection area. A release switch SW2 234 is a switch for starting a capturing operation (i.e., charge accumulation and charge read out operations for acquiring a still image). A live view mode SW 235 is a switch for starting a live view.

The lens controller 108 in the photographic lens 100, i.e., the lens unit, includes a memory 109. The memory 109 stores performance information such as a focal length and a full aperture value of the photographic lens 100, and lens identification (ID) information which is unique information for identifying the photographic lens 100. Further, the memory 109 stores information communicated from the system controller 230.

Furthermore, the memory 109 stores a plurality of pieces of lens information that are latched by an accumulation timing signal from a synchronization signal line during the contrast AF operation.

The photographic lens 100 transmits the performance information and the lens ID information to the system controller 230 in an initial communication performed when the photographic lens 100 is attached to the digital camera 200. The system controller 230 stores the received information in an electronically erasable and programmable read only memory (EEPROM) 223.

Further, the photographic lens 100 includes a lens position information detection circuit 110 which detects and acquires position information of the focus lens 101. The lens position information detected by the lens position information detection circuit 110 is read by the lens controller 108. The lens position information is used for performing a drive control of the focus lens 101, and transmitted to the system controller 230 via the electrical contact unit 107.

The lens position information detection circuit 110 is configured by, for example, a pulse encoder that detects a number of rotational pulses of a motor included in the lens driving mechanism 103. The lens position information detection circuit 110 is connected to a hardware counter (not illustrated) in the lens controller 108, so that the lens position information is mechanically counted when the lens is driven. The lens controller 108 reads out the lens position information by accessing a register of the inside hardware counter and reading a counter value stored in the register.

Figure 2:
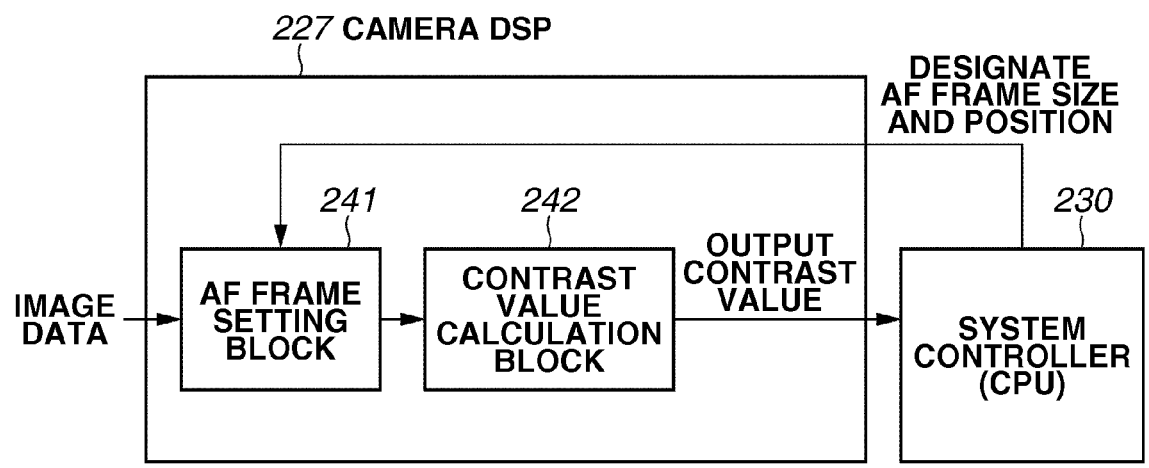
FIG. 2 is a block diagram illustrating an example of a contrast value calculation circuit block according to the exemplary embodiment of the present invention.

The contrast value calculation circuit block inside the camera DSP 227 will be described below with reference to FIG. 2. FIG. 2 is a block diagram illustrating the contrast value calculation circuit block.

Referring to FIG. 1, the CDS/AGC circuit 216 amplifies an electric signal of an image generated by the image sensor 212, and the A/D converter 217 converts the amplified signal to a digital signal. The digitized image data is then input to the camera DSP 227 via the selector 222.

The image data is then input to an AF frame setting block 241 illustrated in FIG. 2 in the camera DSP 227 to calculate the contrast value for detecting a contrast that corresponds to sharpness. The AF frame setting block 241 extracts an image in a region near a main object from the image data of the entire screen and transmits the extracted image to a contrast value calculation block 242. It is preferable that a length of the AF frame in a longitudinal direction is set to be ⅕ to ⅒ of an outer frame of the screen. The system controller 230 can input settings of a position and vertical and horizontal lengths of the AF frame in the screen to the AF frame setting block 241.

An operation according to the present exemplary embodiment will be described below with reference to FIGS. 3 and 4. Unless otherwise stated, the control described below is performed by the system controller 230.

Figure 3:
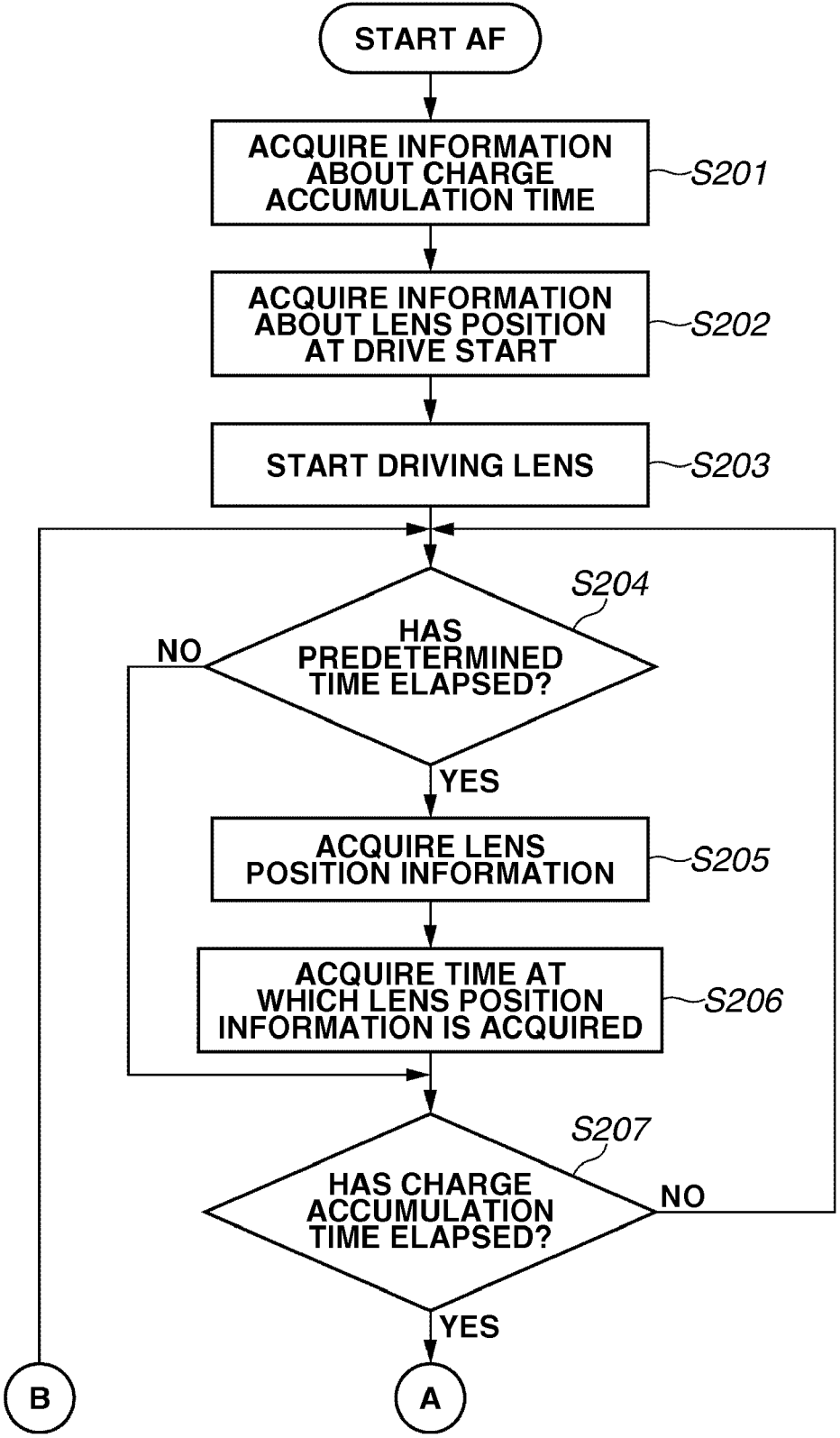
FIG. 3 is a flowchart illustrating an example of an operation of a digital camera according to the exemplary embodiment of the present invention.

Referring to FIG. 3, a user presses an operation switch (SW) 232 and starts the AF operation. The user can also press the release switch SW1 233 instead of the operation SW 232 to start the AF operation.

In step S201, the system controller 230 acquires information about a charge accumulation time according to a frame rate when the AF operation is performed.

In step S202, the system controller 230 acquires lens position information before driving (or moving) the focus lens 101.

In step S203, the system controller 230 starts driving the focus lens 101.

In step S204, after driving the focus lens 101, the system controller 230 monitors whether a predetermined period of time has elapsed. If the predetermined period of time has elapsed (YES in step S204), the process proceeds to step S205. On the other hand, if the predetermined period of time has not elapsed yet (NO in step S204), the process proceeds to step S207. In step S205, the system controller 230 acquires the lens position information from the lens controller 108.

In step S206, the system controller 230 acquires the time at which the lens position information is obtained.

As described above, the system controller 230 acquires the lens position information detected by the lens position information detection circuit 110 at a predetermined time interval. When the digital camera 200 performs the contrast AF operation, it is necessary to acquire contrast values at a plurality of lens positions. Consequently, the system controller 230 acquires the lens position information at the predetermined time interval. As a result, the system controller 230 does not need to communicate with the lens controller 108 to request for the lens position information each time a request is to be made, so that a communication load can be reduced.

In step S207, the system controller 230 determines whether the charge accumulation time of the image sensor 212 has elapsed. If the charge accumulation time has elapsed (YES in step S207), the process proceeds to step S208 illustrated in FIG. 4. On the other hand, if the charge accumulation time has not elapsed yet (NO in step S207), the process returns to step S204.

In step S208, the system controller 230 calculates the contrast value that corresponds to the sharpness of the image from the accumulated charge.

In step S209, the system controller 230 acquires the time at which the contrast value is obtained.

As described above, since the acquisition time of the lens position information acquired in step S205 and the acquisition time of the contrast value information acquired in step S208 are different, it is necessary to relate the acquisition times to each other. Therefore, in step S210, the system controller 230 relates the calculated contrast value to the lens position. The process will be described with reference to FIGS. 5A, 5B, and 5C below.

In step S211, the system controller 230 determines whether the contrast value calculated in step S208 indicates a peak value. If the calculated contrast value is the peak value (YES in step S211), the process proceeds to step S212. In step S212, the system controller 230 determines a final in-focus position by interpolating from the peak value and the preceding and subsequent contrast values, and the lens positions that correspond to each of the contrast values. The system controller 230 then moves the focus lens 101 to the in-focus position.

On the other hand, if the contrast value is not the peak value (NO in step S211), the process proceeds to step S213. In step S213, the system controller 230 determines whether the focus lens 101 has reached a focus end. If the focus lens 101 has not reached the focus end (NO in step S213), the process returns to step S204, and the system controller 230 acquires lens position information. When an exposure control is performed during the AF operation so that the charge accumulation time is changed, the process can return to step S201 instead of step S204.

In step S214, the system controller 230 determines whether another focus end which is different from the focus end detected in step S213 is detected. For example, if the system controller 230 detects a closest distance end in step S213, the system controller 230 determines whether an infinite distance end is detected in step S214. If the different focus end is detected (YES in step S214), the process ends. On the other hand, if the different focus end is not yet detected (NO in step S214), the process proceeds to step S215.

In step S215, the system controller 230 acquires lens position information that corresponds to the focus end detected in step S213.

In step S216, the system controller 230 reverses the driving direction (moving direction) of the focus lens 101.

The above-described process supposes that the charge accumulation time is constant during the AF operation. Consequently, if the system controller 230 determines that the charge accumulation is not completed in step S207, the process returns to step S204. However, in a system which can change the charge accumulation time during the AF operation, the process can return to step S201 if it is determined that the charge accumulation is not completed in step S207.

Calculation of the lens position with respect to the calculated contrast value (sharpness) will be described below with reference to FIGS. 5A, 5B, and 5C.

In a case where the digital camera 200 performs the focus detection based on the contrast value (sharpness) by intermittently moving the focus lens by a predetermined amount and calculating the contrast value (sharpness) of an object, the digital camera 200 performs the charge accumulation of the object image while the lens, i.e., the focus lens is not driven (moving). If the digital camera 200 acquires the lens information at an arbitrary timing regardless of contrast value calculation timing or the charge accumulation time while the lens is not moving, the acquired lens position can be related to the acquired contrast value (sharpness).

However, the digital camera 200 can also acquire the contrast value (sharpness) of the object image while driving the lens in the reverse direction or until the lens reaches the end of the movable range by performing charge accumulation of the object image while driving (moving) the lens. In this case, if the digital camera 200 acquires the lens position after acquiring the contrast value (sharpness), the acquired position information corresponds to a position to which the lens has further moved from when the contrast value (sharpness) is acquired.

Further, in a digital camera or a video camera in which the lens apparatus and the imaging apparatus are detachably attached, there is a communication unit between the lens apparatus and the imaging apparatus used to communicate various information. If the digital camera or the video camera is to acquire the position information about the lens that is driven, via the communication unit, a communication delay may be generated. In this case, the acquired lens position is displaced by a driving amount that corresponds to the communication delay in an opposite direction of driving from the lens position that corresponds to the calculated contrast value (sharpness). Therefore, an error is generated between the calculated contrast value (sharpness) and the acquired lens position, so that an error is generated in the in-focus position.

To solve such a problem, in the present exemplary embodiment, the calculated contrast value (sharpness) is related to the lens position information using a method described below.

FIGS. 5A, 5B, and 5C illustrate examples in which charge accumulation time of a frame with respect to a vertical scanning period are different. The charge accumulation time becomes longer in FIG. 5A than FIG. 5B, and longer in FIG. 5B than FIG. 5C. The vertical scanning period starts from time t' and ends at time t", and the contrast value is acquired as described in step S209 illustrated in FIG. 4 at time T. The contrast value can also be acquired at the time t" instead of the time T. In this case, since calculation time is necessary for acquiring the contrast value, there is a difference between the time T and the time t".

The lens position information (i), (ii), and (iii) are results of the relating the lens position information acquired in step S205 to time at which the lens position information is acquired in step S206. In this example, the lens position information is acquired three times during one vertical scanning period (one frame). The lens position information can also be acquired five times or two times.

When the lens position information (i), (ii), and (iii) are to be related to the time at which the lens position is acquired in step S206, each of the lens position information is related to a previously offset time to cancel the communication delay. As a result, the lens position information is more accurately related to the time with regard to the communication delay.

Figure 4:
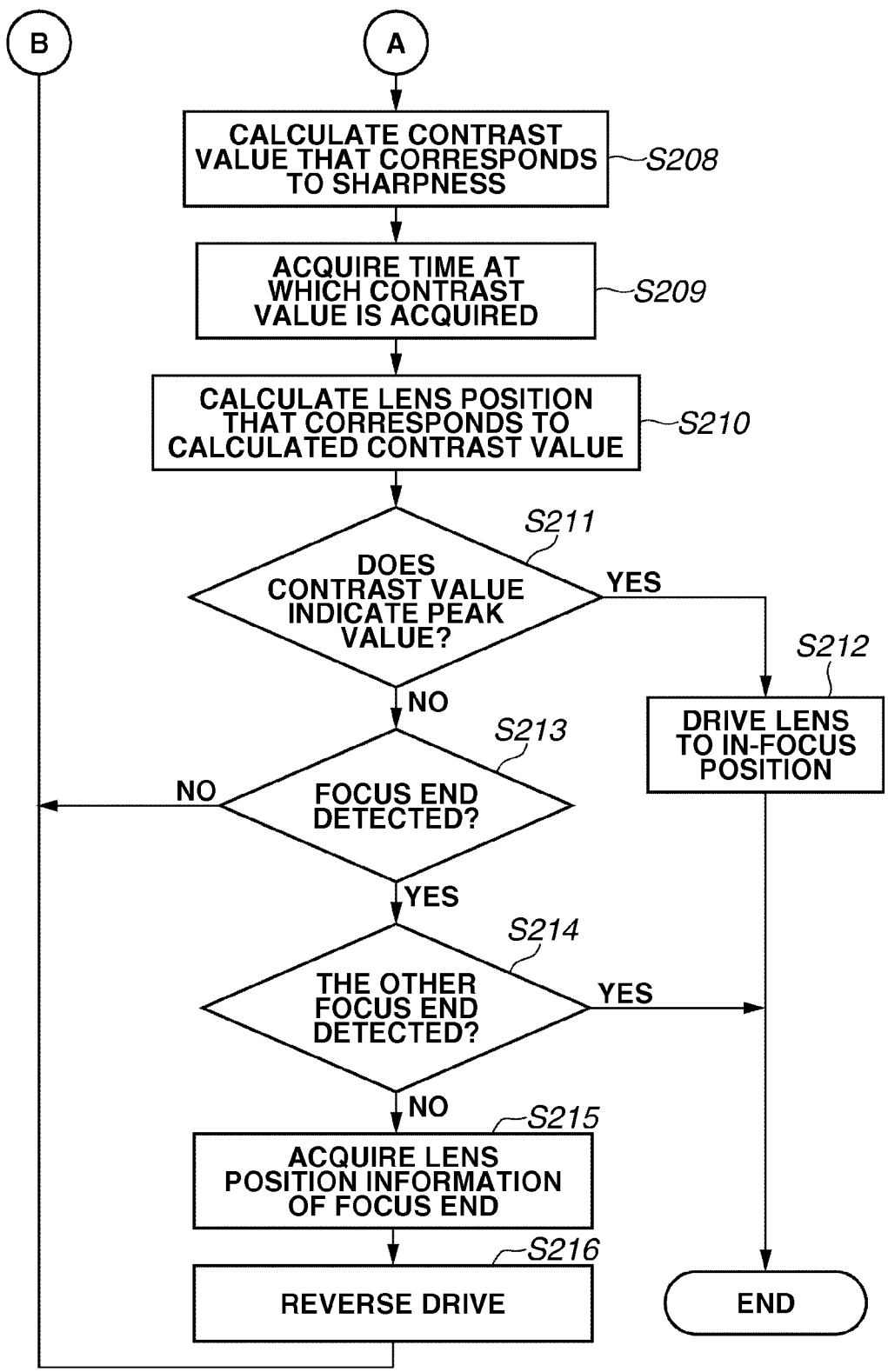
FIG. 4 is a flowchart illustrating an example of an operation of a digital camera according to the exemplary embodiment of the present invention.

In step S210 illustrated in FIG. 4 in the present exemplary embodiment, the contrast values acquired at the time T in FIGS. 5A, 5B, and 5C are related to the lens positions that correspond to center positions of the charge accumulation time of the frame. Therefore, if the center position of the charge accumulation time is positioned between the lens position information (i) and (ii) as illustrated in FIG. 5B, the lens position that corresponds to the center position of the charge accumulation time is interpolated from the lens position information (i) and (ii).

Further, when the center position of the charge accumulation time is positioned between the lens position information (ii) and (iii) as illustrated in FIG. 5C, the lens position that corresponds to the center position of the charge accumulation time is interpolated from the lens position information (ii) and (iii). Since the lens position information is acquired at the predetermined time interval of a given cycle, interpolation is performed using two pieces of the lens position information.

On the other hand, referring to FIG. 5A, the lens position that corresponds to the center position of the charge accumulation time is located before the lens position information (i) at which lens information is first acquired. In this case, the lens position information (i) is related to the contrast value acquired at the time T.

As described above, according to the present exemplary embodiment, when the contrast method is performed in a system in which the lens apparatus and the imaging apparatus are detachably attached, the contrast value (sharpness) acquired at certain timing can be related to the lens position of the focus lens at that timing. Therefore, an error in the focus detection can be reduced.

In the above-described exemplary embodiment, the center position of the charge accumulation time is described based on assumption that the image sensor 212 uses a global shutter read-out method in which there is no time lag. The center position of the charge accumulation time can be similarly acquired if the image sensor 212 uses a rolling shutter read-out method which is used in a complementary metal-oxide semiconductor (CMOS) sensor. Such a case will be described in detail with reference to FIGS. 6A, 6B, 6C, and 6D as another exemplary embodiment.

An operation flow of the present exemplary embodiment is similar to the operation flow of the above-described exemplary embodiment except for the calculation method of the lens position that corresponds to the calculated contrast value (sharpness) described in step S210 illustrated in FIG. 4.

FIGS. 6A, 6B, 6C, and 6D illustrate the center position of the charge accumulation time in a case where an image is sequentially read out from an upper end pixel line to a lower end pixel line in the image sensor 212, e.g., a CMOS sensor, using the rolling shutter method.

Figure 6A:
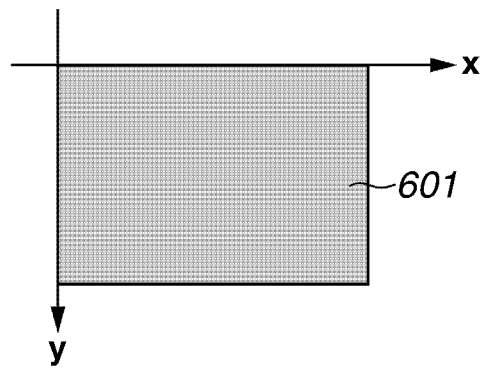
FIGS. 6A, 6B, 6C, and 6D illustrate a center position of a charge accumulation time in a rolling shutter method.

FIG. 6A illustrates one frame 601 that is charge-accumulated in the image sensor 212, in a coordinate system which has a horizontal axis with a coordinate value x in a horizontal direction and a vertical axis with a coordinate value y in a vertical direction. In FIG. 6A, the frame 601 is positioned in the right side of the image sensor 212 when the coordinate value x in the horizontal direction increases. Further, the frame 601 is positioned in the lower side of the image sensor 212 when the coordinate value y in the vertical direction increases.

Figure 6B:
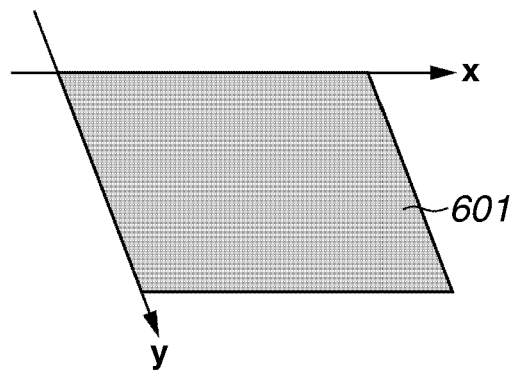

FIG. 6B illustrates the frame 601 illustrated in FIG. 6A in terms of time t instead of the coordinate value x in the horizontal direction as the horizontal axis. Since the charge in the image sensor 212 is sequentially read out for each pixel line, the timing of start to end the charge accumulation is displaced in each pixel line indicated by the coordinate value y. In FIG. 6B, the charge accumulation is started from the upper end pixel line of the image sensor 212, and the charge accumulation of the lower end pixel line is started last.

Figure 6C:
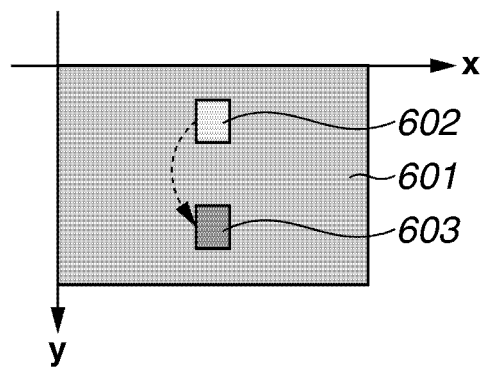

FIG. 6C illustrates a region 602 in which the contrast (sharpness) evaluation is performed on the frame 601 in the coordinate system which has the horizontal axis with the coordinate value x in the horizontal direction and the vertical axis with the coordinate value y in the vertical direction. If the region 602 is moved down in the image sensor 212, the resulting region is indicated as a region 603.

Figure 6D:
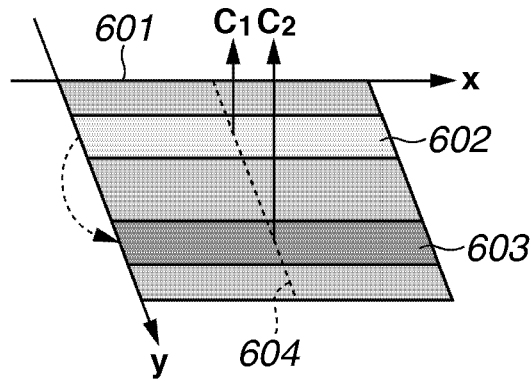

FIG. 6D illustrates the frame illustrated in FIG. 6C in terms of time t instead of the coordinate value of the horizontal direction as the horizontal axis. The region 602 in which the contrast (sharpness) evaluation is performed and the region 603 after the region 602 is moved are illustrated in FIG. 6D. Further, an auxiliary line 604 traces centers of the charge accumulation time of each pixel line. The centers of the charge accumulation time in the region 602 before being moved and in the region 603 after being moved are indicated by time $C_1$ and $C_2$ respectively based on the auxiliary line 604. Consequently, the center of the charge accumulation time is different according to the region in which the contrast (sharpness) evaluation is performed.

As described above, if the image sensor 212 uses the rolling shutter read-out method, it is preferable to correct the center position of the charge accumulation time according to the position of the region in which the contrast (sharpness) evaluation is performed.

FIGS. 7A, 7B, and 7C illustrate a method for correcting the center position of the charge accumulation time according to the position of the region in which the contrast (sharpness) evaluation is performed in a case where the image sensor 212 uses the rolling shutter read-out method. Referring to FIGS. 7A, 7B, and 7C, the charge accumulation time is changed with respect to the vertical scanning period. The charge accumulation time becomes longer in FIG. 7A than 7B, and longer in 7B than 7C. The vertical scanning period starts from time t' and ends at time t". The contrast value is acquired as described in step S209 at time T.

Further, the lens position information (i), (ii), and (iii) are results of relating the lens position information acquired in step S205 to the time at which the lens position information is acquired in step S206. In this example, the lens position information is acquired three times during one vertical scanning period (one frame). However, the lens position information can be acquired five times or two times.

The system controller 230 obtains timing of the center of the charge accumulation time based on the following equation.

$$tc=(d\times y)+ts+(acc/2)$$

tc: the timing of the center of the charge accumulation time of the contrast evaluation region d: a delay time in charge accumulation start timing per one line y: line coordinate ts: charge accumulation start timing of a leading line acc: the charge accumulation time The system controller 230 then relates the obtained timing of the center of the charge accumulation time with the lens position.

For example, referring to FIG. 7B, the center position of the charge accumulation time is located between the lens position information (i) and (ii). In this case, the lens position that corresponds to the center position of the charge accumulation time is interpolated from the lens position information (i) and (ii). Further, when the center position of the charge accumulation time is located between the lens position information (ii) and (iii) as illustrated in FIG. 7C, the lens position that corresponds to the center position of the charge accumulation time is interpolated from the lens position information (ii) and (iii). Since the lens position information is acquired at the predetermined time interval of a given cycle, interpolation is performed using the two pieces of the lens position information.

On the other hand, referring to FIG. 7A, the lens position that corresponds to the center position of the charge accumulation time is located before the lens position information (i) which is first acquired. In this case, the lens position information (i) is related to the contrast value acquired at the time T.

As described above, the contrast value (sharpness) acquired at certain timing can be related to the lens position of the focus lens at that timing even in a case where the charge accumulation uses the rolling shutter method. Therefore, an error in the focus detection can be reduced.

In the above-described exemplary embodiments, the system controller 230 of the digital camera 200 relates the calculated contrast value to the lens position information. However, if calculation performance of the lens controller 108 is high, the lens controller 108 in the lens apparatus 100 can perform the above-described process. In this case, the digital camera 200 transmits the contrast value and the acquisition time of the contrast value to the lens controller 108. The lens controller 108 then relates the received contrast value to the lens position using the acquired plurality of pieces of the lens position information.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-011630 filed Jan. 22, 2008 and Japanese Patent Application No. 2008-169330 filed Jun. 27, 2008, which are hereby incorporated by reference herein in their entirety.

What is claimed is:

1. An imaging apparatus to which a lens apparatus is detachably attached comprising:
    an image sensor configured to generate an image signal by photoelectrically converting an object image;
    a first acquisition unit configured to acquire a contrast value of the image signal obtained by the image sensor;
    a second acquisition unit configured to acquire lens position information at a predetermined time interval; and
    a focus detection unit configured to detect a focal position based on outputs of the first acquisition unit and the second acquisition unit,
    wherein the focus detection unit selects the lens position information that corresponds to the contrast value acquired by the first acquisition unit, from a plurality of pieces of the lens position information acquired by the second acquisition unit at the predetermined time interval, and detects the focal position.

2. The imaging apparatus according to claim 1, wherein the second acquisition unit acquires the lens position information at the predetermined time interval which is shorter than a charge accumulation time in the image sensor.

3. The imaging apparatus according to claim 1, wherein the second acquisition unit acquires the lens position information from the lens apparatus which is detachably attached to the imaging apparatus.

4. The imaging apparatus according to claim 3, wherein the focus detection unit selects the lens position information that corresponds to the contrast value acquired by the first acquisition unit including a delay time in communication with the lens apparatus, and detects the focal position.

5. The imaging apparatus according to claim 3,
    wherein a charge accumulation timing is different for each pixel in the image sensor, and
    wherein the focus detection unit selects the lens position information that corresponds to the contrast value acquired by the first acquisition unit based on each charge accumulation timing of a pixel in a region in which the contrast value is acquired, and detects the focal position.

6. A lens apparatus which is detachably attached to an imaging apparatus that includes an image sensor configured to generate an image signal by photoelectrically converting an object image, and a first acquisition unit configured to acquire a contrast value of the image signal acquired by the image sensor, the lens apparatus comprising:
    a second acquisition unit configured to acquire lens position information at a predetermined time interval; and
    a focus detection unit configured to detect a focal position based on outputs of the first acquisition unit and the second acquisition unit,
    wherein the focus detection unit selects the lens position information that corresponds to the contrast value acquired by the first acquisition unit, from a plurality of pieces of the lens position information acquired by the second acquisition unit at the predetermined time interval, and detects the focal position.

* * * * *